April 2, 1940.  W. W. MACFARREN  2,195,653
ROTARY SHEARING APPARATUS
Filed Aug. 17, 1936  5 Sheets-Sheet 3

INVENTOR.
Walter W. Macfarren

April 2, 1940.　　　W. W. MACFARREN　　　2,195,653
ROTARY SHEARING APPARATUS
Filed Aug. 17, 1936　　　5 Sheets-Sheet 5
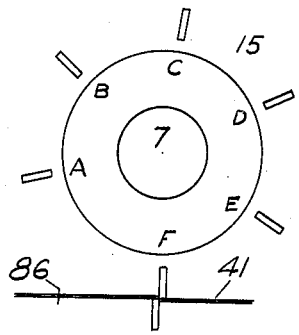
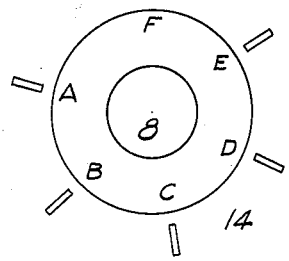
Fig. 8.
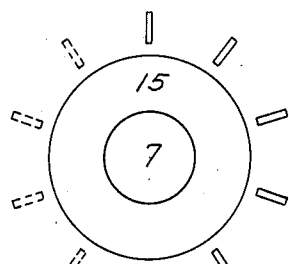
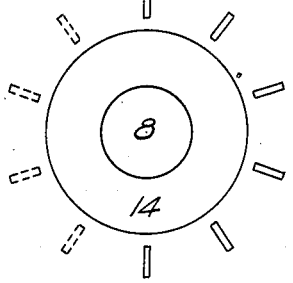
Fig. 9.
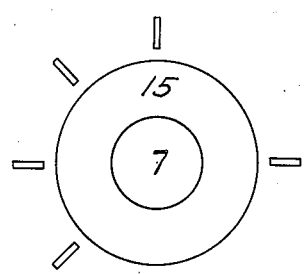
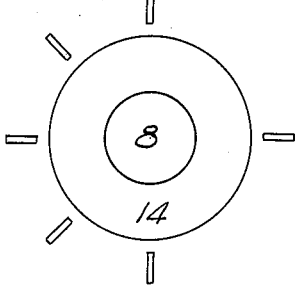
Fig. 10.
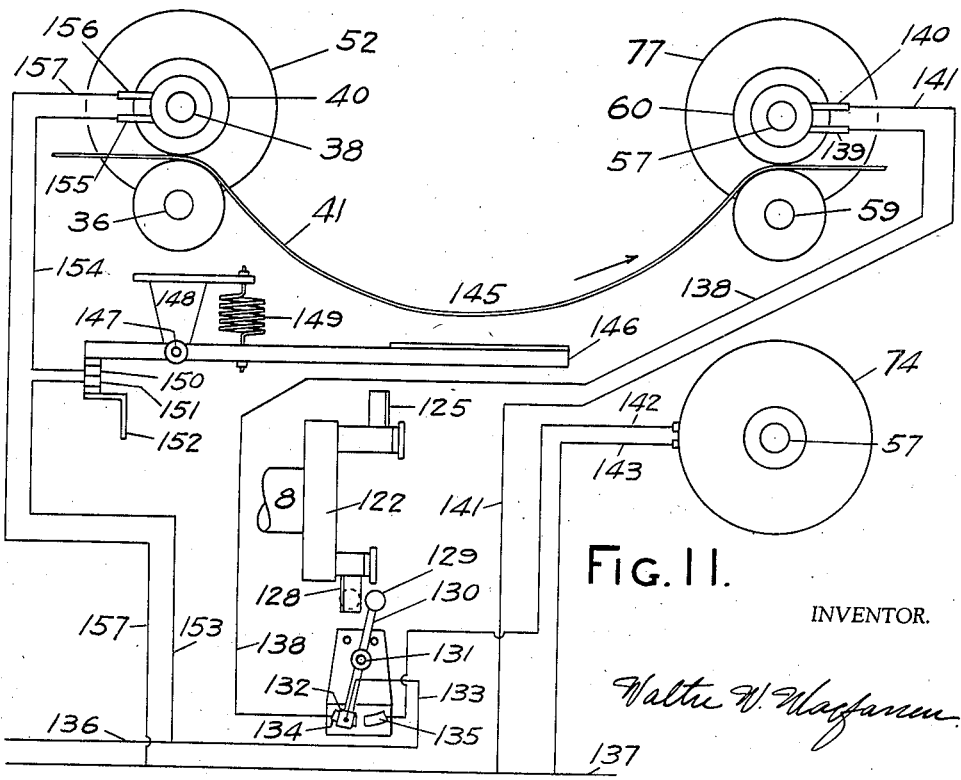
Fig. 11.
INVENTOR.
Walter W. Macfarren

UNITED STATES PATENT OFFICE 2,195,653

ROTARY SHEARING APPARATUS

Walter W. Macfarren, Los Angeles, Calif.

Application August 17, 1936, Serial No. 96,501

38 Claims. (Cl. 164—68)

My invention relates to rotary shearing apparatus for subdividing by transverse cuts a moving metal bar. In several previous applications I have illustrated and described machines coming properly under the title of "Rotary flying shears" as they engage and cut up the moving bar directly as it emerges from the rolls of a rolling mill, and at high speeds.

The present invention however, relates principally to the cutting up of stored material, or of material in transit through the mill, and on the movement of which no other apparatus directly depends, although the shear of the present invention may take the product directly from a cold rolling mill.

The design shown is specifically adapted to the cutting up into short sections of thin strip steel from a coil of the same, although the principles involved, and the general arrangement of the knife holders, knife drums, strip feeding means, etc., may obviously be applied to machines of larger capacity and for longer section lengths.

Various inventors have employed other forms of apparatus to solve this problem: for instance the patent to F. C. Biggert, No. 1,852,282, dated April 5, 1932, shows a drive and speed changing device for a rotary shear.

This device, as shown, employs about seventy gears, about a dozen shafts, and a "Scotch Yoke" for driving the shear at a speed widely varying from that of the bar to be sheared, in order to change the length of the cut sections, while obtaining some approximation to equal speeds at the instant of cutting, and all of the above recited mechanism is exclusive of the shear proper.

Such a machine, according to my best information, may be employed to cut sections from a bar moving at a maximum speed of about 300 feet per minute, and might therefore be used to cut stock coming out of a cold rolling mill at such a speed, or to cut up coils of previously rolled material.

The machine of the present invention, about to be described, may also do either of these things, but I have described it more specifically as cutting up a coil. It will, I think operate at speeds of from 200 to 1000 feet per minute in such service, with its cutting members running at a substantially constant speed, and without a multiplicity of gears and similar elements.

The principles of my invention are as follows: The material is cut by spaced coacting rotary knives, these knives being usually spaced exactly to the length of the cut desired.

The material is usually fed at the exact linear speed corresponding to the circumferential speed of the knives, although a slight asynchronism between these speeds may be obtained by a simple adjustment.

The knives are adjustable circumferentially around the outer circumferences of a pair of rotary drums to vary their pitch, there being a number of even spaces corresponding to the section length to be cut, during the cutting period of which the material to be cut is fed to the knives, and one odd space of varying length, and during the rotation of which the feed of the material to the knives is stopped.

This odd space may be called the "gap," and is the crux of the present invention. By its use, any length of sections may be cut between the whole pitch circumference of the drums, (using a single knife on each drum), and the closest adjustment obtainable for the knife spacing.

It will be noted that this design is proposed for cutting comparatively short length from comparatively thin material, such as thin strip steel or tin plate.

However, the size of the machine and its performance is limited only by the skill of competent machine designers.

As a concrete example, and to aid in a clear understanding, I will describe the machine as having drums of 60" circumference, or about 19⅛" pitch diameter, measured on the cutting edges of the knives.

This machine may employ from one to ten pairs of coacting knives of any reasonable length, and may cut sections from a moving bar from one to sixty inches in length, and varying in length by as little as ⅟₁₀₀₀", if desired.

The bar speed, when cutting from coils may be assumed for the moment, to vary from 200 to 500 feet per minute as adjusted by the operator and at the latter speed the drums would rotate at 100 R. P. M. These speeds are tentative only, as will appear later. In the drawings, Fig. 1 is a side elevation of the apparatus.

Fig. 8 is a diagram of a certain knife spacing.

Figs. 9 and 10 are similar diagrams of different spacings.

Fig. 11 is a diagram of the electrical controls, etc., excepting the motor controls.

Figure 1:
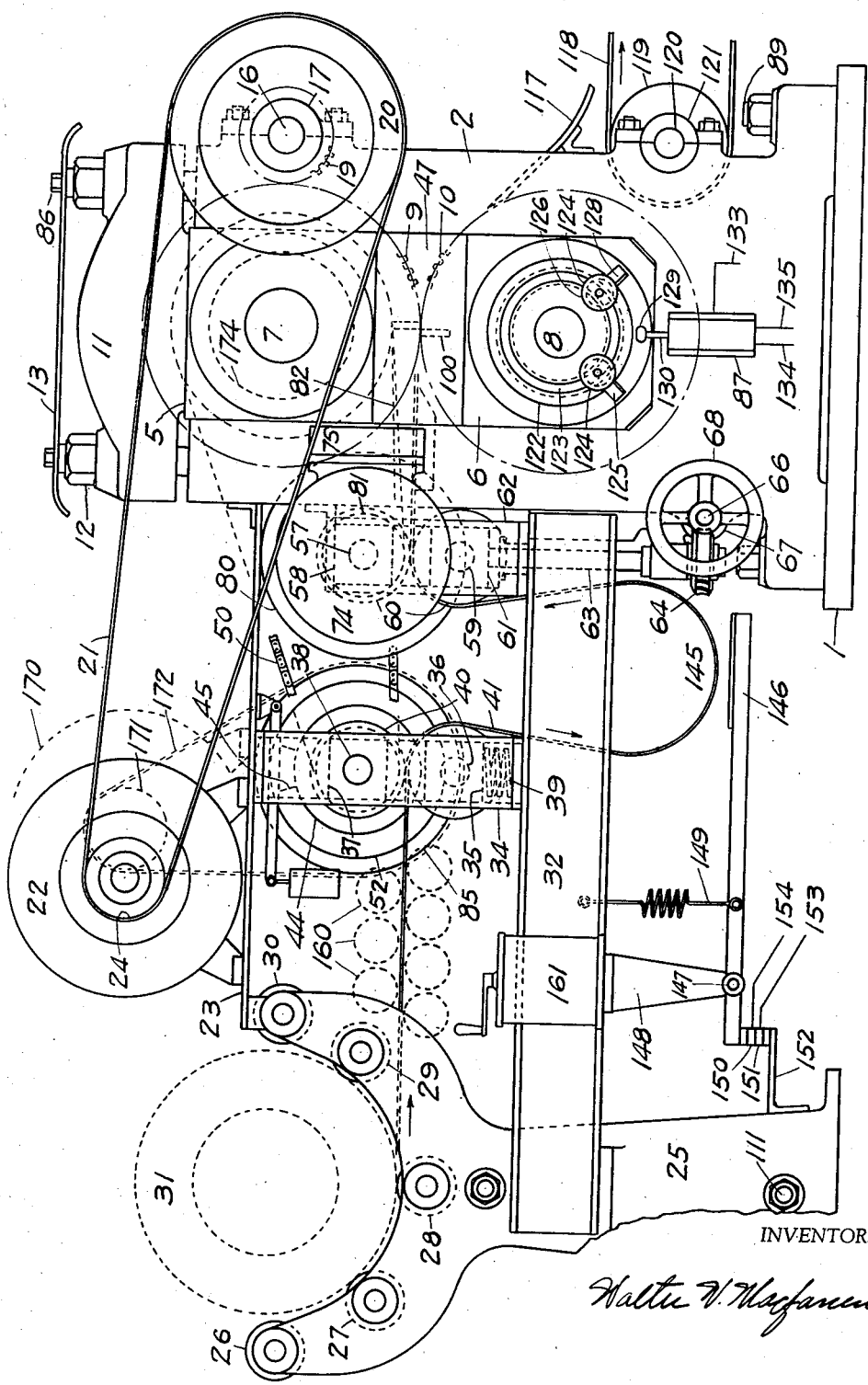

The machine comprises a bed plate 1, which supports a pair of housings 2 and 3, in which are mounted upper bearing boxes 5 and lower bearing boxes 6, spaced apart by separators 47, and which may be provided with any suitable type of bearings, the roller bearings 4 being preferred.

The upper boxes 5 support the shaft or trunnions 7 and 7a, and the lower boxes 6 support the trunnions 8 and 8a (not shown). The upper trunnion 7a has a gear 9, and the lower trunnion 8a has a gear 10, these two gears meshing with each other and being provided with double helical teeth. The gears 9 and 10 are of equal size and may be exact duplicates.

A lower knife carrying drum 14 is integral with the trunnions 8 and 8a, and a similar upper drum 15 is integral with the trunnions 7 and 7a. A drive shaft 16 is mounted in bearings 17 and 18, formed respectively in the housings 2 and 3, and carries a pinion 19 which meshes with and drives the gear 9.

At the opposite end of the shaft 16 there is mounted a fly wheel 20, which is driven by a belt 21 from a motor 22, the latter being set on a platform 23, and having a pulley 24 which drives the belt 21. A second motor 170, having a pulley 171, from which a belt 172 may drive a rim 173 on the flywheel 85, to actuate the coil clutch 52, may be used on occasion, as indicated in dotted lines in Figs. 1 and 2.

At the left end of the machine, a pair of Y shaped standards 25 support five idle rollers 26, 27, 28, 29, and 30, forming a cradle to support the coil 31, of material to be cut. A pair of side members 32 and 33, extend from the housings 2 and 3 to the standards 25, and are secured respectively to each of them.

A pair of vertical guide members 34 may be fastened to the members 32 and 33 to support lower bearings 35, for the shaft 36, and upper bearings 37 for the shaft 38.

The shafts 36 and 38 carry a pair of ordinary feed rolls 40 which may be duplicates, and are preferably about one third the pitch diameter of the knife drums 14 and 15, and would thus have the same peripheral speed as the drums if they ran 300 R. P. M. when the drums ran 100 R. P. M.

The upper boxes 37 may be rigidly secured in the guides 34, and the lower boxes 35 may slide vertically therein, and be pressed upward by the springs 39, thus acting to pinch the strip 41 between the rolls 40. A pair of small spur gears 42 and 43 (not shown) connect the pinch rolls 40 to drive one from the other, the teeth of these gears being long enough to permit of the slight spreading of the rolls 40 required by the thin strip 41.

The upper shaft 38 may be provided with a small brake drum 44 which is engaged by a weighted shoe 45, to provide a small and constant retarding effect for the feed rolls 40.

A long bearing 46 supports a short shaft 48, which carries a sprocket 49, which is driven by a chain 50 from a sprocket 51 secured to the end of the upper drum trunnion 7a.

This chain 50 runs constantly while the machine is operating, and drives a magnetic clutch member 52 mounted on the short shaft 48, and which may engage and drive a coacting clutch member 53 on the adjacent end of the shaft 38. It will be obvious that the shafts 38 and 48 are in line with each other.

The bearing 46 may form part of a bracket 55, which is supported at one end by the housing 3, and has an opposite depending end resting on the side beam 33.

The feed rolls 40 just described, control the unwinding of the coil 31, and they act intermittently to maintain a varying "loop" in the strip 41, as will hereinafter appear.

The strip feed rolls 60, now to be described, have two very special functions, and though of similar dimensions, are quite different in construction. The upper shaft 57 is supported in bearings 58, which may be rigidly secured within a guide frame 62 on each of the housings 2 and 3.

The lower shaft 59 is mounted in bearings 61, the same being vertically adjustable in the guides 62, and adjusted by a pair of vertical screws 63, one at each of the housings 2 and 3. Each of the screws 63 is actuated by a worm wheel 64, and each worm wheel 64 is driven by a small worm 65 (not shown), and both worms 65 are mounted on a small cross shaft 66, supported in bearings 67 formed in the housings 2 and 3, and operated by a hand wheel 68 having a divided scale on its periphery.

Each of the strip feed rolls 60 is composed of a body portion 69, of metal, and an elastic cover or sheath 70, which is preferably made of rubber moulded to the roll, of a diameter of about 6½", and of the consistency or hardness of a rubber tire.

The purpose of this construction will appear later, and the cover 70 may be continuous, or in the form of adjacent small rings, as shown.

The shafts 57 and 59 are provided with connecting spur gears 71 and 72 (not shown), similar to the gears 42 and 43. At one end of the shaft 57 there is secured a brake member 73, which may be pulled magnetically against a stationary brake member 74, which is mounted on a bracket 75 secured to the housing 2.

At its opposite end, the shaft 57 carries a magnetic clutch member 76, which may engage a second magnetic clutch member 77, mounted on a short shaft 78, which is in line with the shaft 57. The shaft 78 is supported in bearings 79 forming part of the bracket 55, and is provided with a small fly wheel 80.

Between the bearings 79, there is mounted on the shaft 78, a sprocket 81, which is driven by a chain 82, from a sprocket 83 mounted on the trunnion 7a, and located just inside of the sprocket 51. The sprocket 81 may be a duplicate of the sprocket 49, and the chains 50 and 82 may be the same except as to length.

It will be understood that the clutch 77 drives the shaft 57, and the feed rolls 60, and that the brake 74 stops both of them; both of these actions, that is, starting and stopping, being quickly accomplished.

Figure 3:
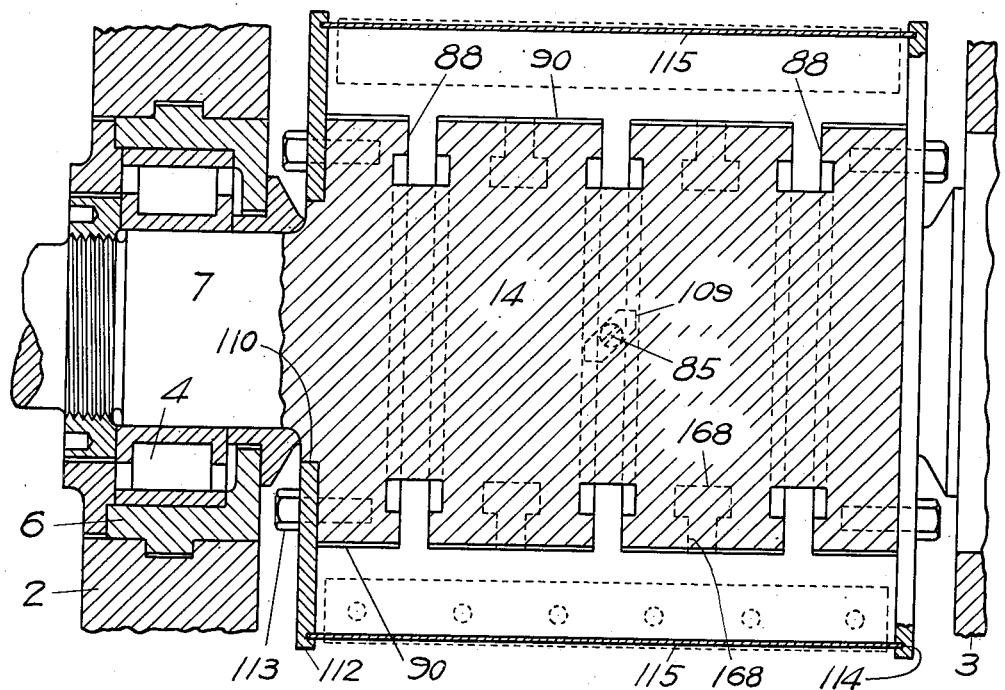
Fig. 3 is a longitudinal cross section through a portion of the lower knife drum.
Figure 4:
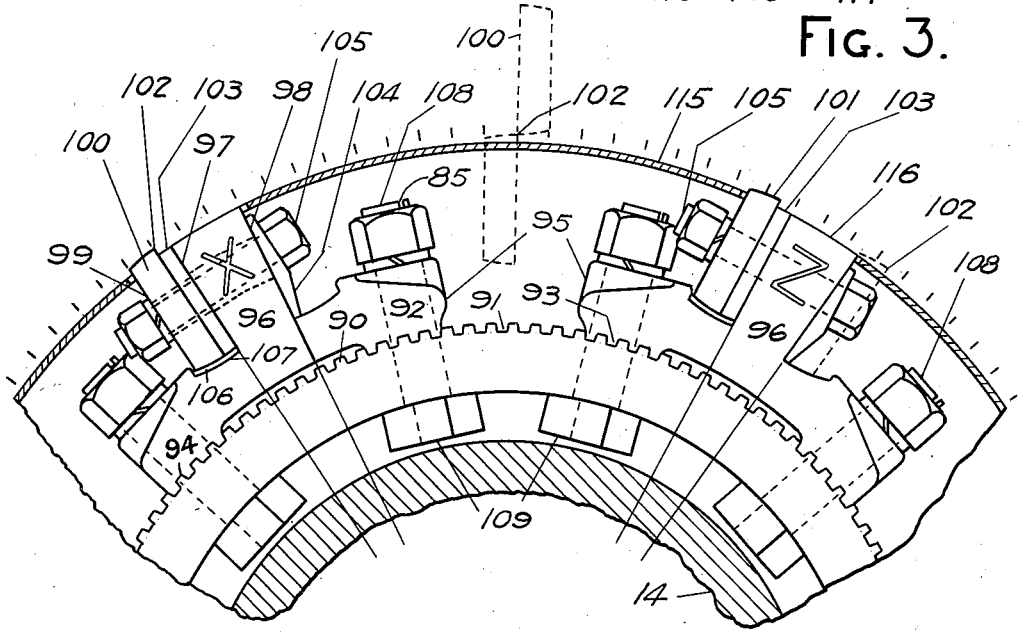
Fig. 4 is an enlarged section showing two adjacent knife holders and a portion of the lower drum.

Referring to Figs. 3 and 4, the drums 14 and 15 may be exact duplicates except as to their trunnions, so only the lower drum 14 will be described. The drum 14 in the small machine shown, is integral with its trunnions 8 and 8a, but may obviously be a hollow cylinder mounted on a shaft, for a larger machine.

Formed in the outer portion of the drum 14, there are three or more circumferential T slots 88, preferably machined for smoothness. On the exterior surface of the drum, there are formed, preferably by a hobbing process, one hundred twenty teeth 90, similar in shape to a rack tooth.

These teeth 90 extend from end to end of the drum 14, except where they are interrupted by the T slots 88, and each tooth 90 corresponds to a distance of one half inch (arc measurement) on the pitch line of the knife cutting edges, so that shifting the knife holders 95 from tooth to tooth, changes the cutting adjustment of the attached knives 100 the amount of ½".

Between the teeth 90 there are spaces 91. The knife holders 95, of which there may be as many as twenty, are composed of a base portion 92 provided at its sides with teeth 93, and tooth spaces 94, arranged on a curve to fit the exterior of the drum 14.

Rising from the base 92 there is a rib 96, having radial sides 97 and 98, the planes of these sides when extended, passing through the center of the drum 14. The plane of the side 98 passes through the center of a tooth 90, on the drum 14, and the plane of the side 97 passes through the center of a space 91.

The ends of the rib 96 bear a letter X at one end and a letter Z at the other, or some similar distinguishing marks. As the teeth 90 are specified to be ½" circular pitch, when measured on the knife pitch line, it will be seen that if the knife holders 95 are turned end for end in the same position on the drum 14, (same teeth meshing) the position of the faces 97 and 98 will have been changed ¼" circumferentially as measured on the pitch line of the knives 100.

The knives 100 have flat parallel sides 99, two curved or beveled edges 101, and two cutting corners or edges 102. Liners 103 may be placed between the knives 100 and the faces 97 or 98, when required to obtain the desired knife spacing. Thin shims (not shown) may also be placed between the knives and the liners, or between the liners and the rib 96, to accurately register a knife on one drum with its coacting knife on the other drum. Tapered washers 104 are placed against one side of the rib 96, for the bolts 105 which secure the knives 100.

Curved shims 106 are placed between the adjacent edge of the knife 100 and the curved seat 107, to adjust the knives radially for changes due to wear or grinding of the faces 101. The knife holders 95 are rigidly clamped to the drum 14 by the bolts 108, which engage the T slots 88. The bolt heads 109 are so formed that they can be slipped radially into one of the slots 88, and will lock themselves therein with about ⅛ of a turn, and may have slots 85 cut in their ends to show the position of the head, the said slot being parallel with the length of the head, as indicated in dotted lines in Fig. 3.

While the teeth 90 are formed continuously around the surface of the drum 14 to provide 120 positions ½" apart (on the pitch line) for the knives 100, the knife holders 95 may have only two or three teeth 93 at each side, as shown.

The width (circumferential) of the knife holders 95 in the present example, is such that ten or more of them may be placed on the drum 14 with proper clearance between them. From the above description it will be seen that the knife holders 95 may be shifted to any spacing in multiples of ½" by direct movement and engagement with the proper teeth 90; that by turning them end for end, engaging the proper teeth 90, and transferring some of the knives 100 from one side to the other side of the rib 96 an additional adjustment of ¼" may be obtained; and that finally, by the use of liners 103 of proper thickness, an additional adjustment up to ¼" may be obtained, so that any desired spacing of all the knives used except one, in gradations as fine as desired, may be obtained.

As these spaced knife holders stand up like teeth in a gear, and as very short sections may be cut, I provide for the lower drum 14 additional parts not needed on the upper drum 15 as follows: At each end of the drum 14 there is formed a circular shoulder 110, having a smooth outer cylindrical surface, which is surrounded by a loosely fitting ring 112, secured to the drum by cap screws 113.

The rings 112, near their outer circumferences, are each provided with a narrow groove 114, and in the grooves 114 there are placed curved sections of strip steel 115, extending between the knife holders 95, and closely adjacent to the knives 100 at one end, and to the faces 97 (or 98) at the other end.

These sections 115 form a smooth cylindrical cover for the lower drum 14, and are positioned radially by the grooves 114 so as to be flush with the outer cylindrical surfaces 116 of the ribs 96, the knives 100 projecting radially an amount sufficient to afford clearance for the cut. As the short sections of the strip 41 are cut off, they ride on the sections 115 until they reach a sloping guide 117 (see Fig. 1) which delivers them to a conveyor belt 118, or other transporting means for delivery elsewhere. The conveyor belt 118 may ride on a pulley 119, mounted on a shaft 120, supported in bearings 121 formed in the housings 2 and 3, and may be driven by any suitable means, as by a chain drive (not shown) from the lower drum trunnion 8.

Reverting now to Fig. 4, if that portion of the base 92 of the knife holder 95 to the right of the rib 96, is omitted, and the omitted teeth 93 supplied, the left set of bolts 108 would probably be sufficient to hold the knife holders 95 when cutting light material, and by these means sections as short as 4" may be cut. This does not mean however, that fifteen knives per drum would be required, as will be seen later.

In Figs. 8, 9, and 10, I have illustrated in diagrams, three different knife settings. In Fig. 8, using six pairs of coacting knives, they are arranged to cut five sections of 9½" per revolution of the drums, with a gap of 12½". If one pair of knives were omitted, the remaining ones would cut four sections with a gap of 22".

In Fig. 9, ten pairs of evenly spaced knives would cut ten 6" sections per revolution of the drums 14 and 15.

If the four pairs of knives shown in dotted lines were omitted, the remaining six pairs of knives would cut five sections per revolution, thus producing fewer cut sections, but of the same lengths. While this latter operation may seem to be uneconomical, it may the reverse if time is available, as it saves the setting up of the other four pairs of knives.

In this connection the following conditions are to be noted. The teeth 90 on the drums 14 and 15 may be cut as accurately as the teeth of the best cut gears, and in a similar way, and may be very accurate, say to within ⅖₁₀₀₀" or ⅗₁₀₀₀". The teeth 93 on the knife holders 95 may be milled at one setting with great accuracy. After which the knife holders 95 may be clamped to one of the drums, and the sides 97 and 98 of the rib 96, and the curved seats 107 may be milled accurately to size, using the supporting drum 14 or 15, which may be mounted on centers, as a dividing or spacing member.

The liners 103 may also be formed with equal accuracy, so that, to sum up, there is no apparent reason why the knife holders and the knives may not be put together in the desired relation on the bench, and transferred bodily to the shear when needed. The bolts 108 need not be removed as a turn of their nuts will loosen them, and they may then be positioned (turned) by the slots 85 for easy removal from, or application to the drums. Thus, by the provision of some extra knife holders, when a change of section length is to be made, the knife holders may be prepared in advance and ready for a quick changeover.

Very accurate knife settings can be made by gauges used at the bench on a "dummy" (portion of a) drum, and a few trial cuts can be made at slow speed before starting production of the new lengths.

In Fig. 10 I have shown a knife spacing to cut two 15" and four 7½" sections per revolution. Obviously two of the 7½" sections need not be cut. Such an arrangement, when only one machine is available, may be of advantage in filling orders requiring two different lengths of sections, as for instance, the ends and side pieces for square cans.

While I have so far described the present invention as applying to coiled stock, it is obvious that it might be used to cut up light strip or bars, as for instance flat bars for various purposes, or round bars for bolt stock preparatory to heading.

In this case the whole length of the bar would have to be started and stopped by the feed rolls 60, or by both the rolls 40 and the rolls 60 operating in synchronous relation. This would slow down the cutting speed and necessitate a change in the details of the sheath 70, if round bars were to be cut.

It will be noted that when cutting with evenly spaced knives, the whole elapsed time is usefully employed, for cutting, and when the bar is fed at a speed of 500 feet per minute the product is nearly 500 feet of cut sections (less crop ends).

However, when cutting with a "gap," there is some time apparently lost, in the proportion of the idling time to the cutting time, or of the strip stoppage to the strip travel. This lost time may be only apparent and not real, if the machine will cut, while cutting at a rate double or triple that of similar mechanisms now in use, which is the expectation.

Mounted on the upper drum trunnion 7, I provide a faceplate 122, secured thereto and having a circular T slot 123, in which are placed two bolts 127 which have hand nuts 126, each of which may be used to clamp a shifter 124 in a definite angular position with the knives on the lower drum 14, the knives on the drum 15 being, of course, in coacting relation.

One of the shifters 124 has a slanting wing 125, sloped about 45 degrees like a helical gear tooth, in one direction (say right hand), and the other shifter has a similar slanting wing 128 (say left hand) of opposed slope.

The wings 125 and 128 alternately engage a mechanical switch lever 130, by striking a ball shaped member 129 secured thereto, and which may be made of rubber, to cushion the blows.

The switch lever 130 is pivoted on a pin 131 secured to the housing 2 or other convenient support, and has a contact 132 supplied with current by a wire 133, and adapted to engage either of a pair of contacts 134 or 135. See Figs. 1 and 11.

The wire 133 takes current from the positive main 136, and current may flow through the wire 133 and contact 132, to contact 134, and thence through the wire 138 to one brush 139 for the magnetic strip feed clutch 77. From the other brush 140, the circuit to the main 137 is completed by the wire 141.

It will be understood that the ball 129 is always in the path of one or the other of the wings 125 and 128, so that either the clutch 77 or the brake 74 is energized, except during the shifting action of contact 132. As shown in Fig. 11 the clutch 77 is energized, but when the lever 130 is thrown over, and the contacts 132 and 135 are engaged, current passes from main 136 through the wire 133 and the contact 132, to the contact 135, and thence through a wire 142 to one terminal of the magnetic brake 74. After passing through the brake coil, the current flows from the other terminal through a wire 143 to the negative main 137.

As before noted, the action of the strip feed rolls 60 may be intermittent, due to the varying "gap" of the knives, when certain lengths are being cut. It is necessary to quickly advance the strip 41 during the cutting period, and therefore that portion of the strip 41 adjacent to the rolls 60 must always be free to move.

To provide for this, the coil feed rolls 40 are also intermittently operated, and a "loop" 145 is formed in the strip 41 between the lower feed roll 40 and the lower feed roll 60. The length of the loop controls the feeding action of the rolls 40, and the curvature of the loop, and the space allowed therefor will depend on the thickness and stiffness of the material to be cut, or in other words, on its ability to bend without permanent set.

Just below the normal bottom of the loop 145, there is a light lever 146, pivoted by a pin 147 to a bracket 148, which may be secured to the frame structure in any convenient way. The lever 146 is provided with a contact 150, which may engage a stationary contact 151 on a small bracket 152.

A spring 149 is so adjusted as to keep the contacts 150 and 151 in contact with each other until the loop 145 extends and presses down on the lever 146. When the contacts 150 and 151 are in contact, current may flow from the main 136 through a wire 153, to contact 151; thence through a wire 154 to one brush 155 for the magnetic clutch 52. From the other brush 156 the current flows through a wire 157 to the negative main 137.

It will thus be seen that when the loop 145 lengthens, a sufficient amount, the clutch 52 for the coil feed rolls 40 is cut out, and the rolls 40 are stopped. As soon as the loop 145 shortens enough to allow the contacts 150 and 151 to re-engage each other, the feed rolls 40 are started again, and thus the loop 145 is automatically controlled.

Figure 5:
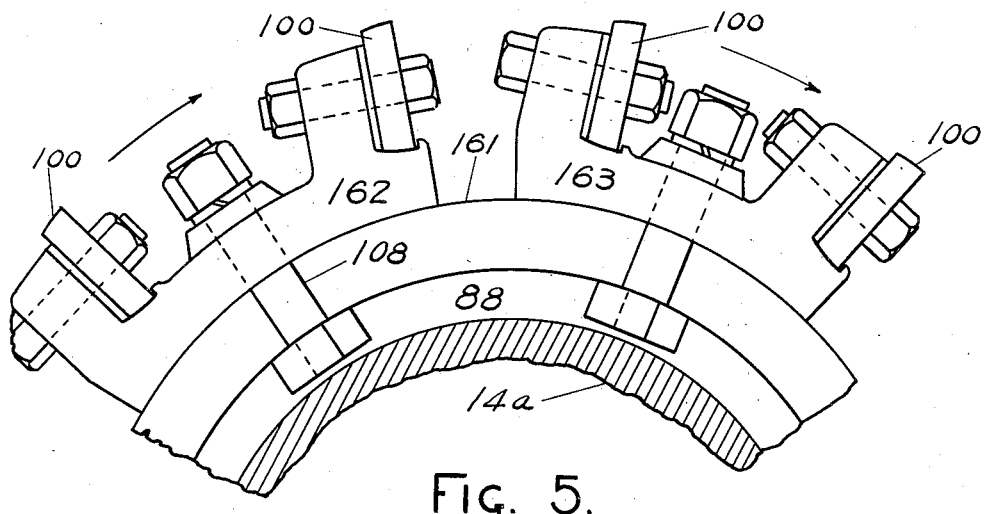
Fig. 5 is an end view of two double knife holders.
Figure 6:
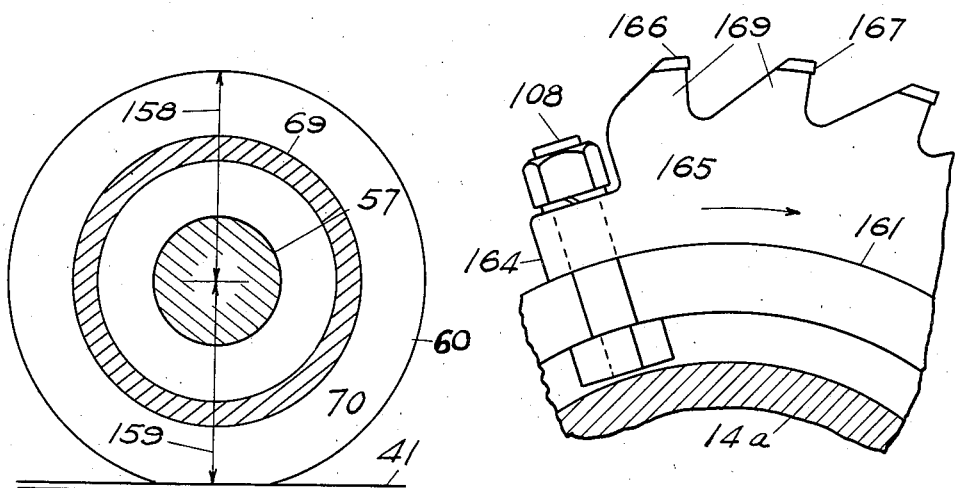
Fig. 6 is an end view of a multiple knife holder.

In Figures 5 and 6 I have shown two important modifications of the construction shown in Figs. 3 and 4. The first is the absence of teeth 90 on the drums 14 and 15; the second is the use of multiple knife holders.

In Fig. 5 the drum 14a may have a smooth exterior cylindrical surface 161 between the T slots 88, and of the same diameter as the outer end of the teeth 90 on the drum 14.

The knife holders 162 and 163 may be bored to fit the surface 161, and clamped thereto by the bolts 108 as before, except that now the knife holder location is obtained by frictional contact only, instead of positively as shown in Fig. 4.

If this construction is used, additional T slots 88 may be formed in the drums 14 and 15, as shown at 168 in Fig. 3. The vise like clamping effect of the bolts 108 on the drums (surface 161) should be ample to hold the knife holders 162 and 163 in proper position for all light cutting, and perhaps also, for the heaviest work the machine can perform.

It will be noted also, that since the knife holders 162 and 163 have the same inner radius as the outer ends of the teeth 90 on the drums 14 and 15, they may be used interchangeably with the knife holders 95 on the same drums. Thus, for special odd length short sections, knife holders 162 or 163 may be quickly made.

With the teeth 93 on the knife holders 95 omitted, (with or without the omission of the drum teeth 90), circumferential adjustments of any degree of accuracy may be made by simply shifting the knife holders around the drums, and clamping them in desired positions by the bolts 108.

In Fig. 5 the knife holder 162 has knives 100 spaced 6" apart, which spacing is difficult to obtain with knife holders of the type shown at 95. The knife holder 163 has knives spaced 5" apart, and the adjacent knives of the holders 162 and 163 are shown 4" apart. Thus three different lengths of sections could be cut at the same time, if desired.

In this connection, the construction and operation of my improved rotary shear has been in so far described as operating with a number of evenly spaced knives, and one odd space, or gap. However, if it is desired to cut two different lengths at the same time, the machine may be easily arranged to cut with two groups of evenly spaced knives and two gaps, the two groups of knives having different spacings, as 5" and 6". To do this, it is merely necessary to provide an additional faceplate 122, as indicated in dotted lines at 174 in Fig. 1, with its shifters 124, and to provide an additional switch 130 connected in parallel with the present switch 130, so the two gaps may be independently controlled and adjusted.

In Fig. 6 I have shown a multiple knife holder 165 for cutting very short sections, as for instance, 2" long. The casting 165 has large teeth 169, to which the small knives 166 may be fastened, as by welding. The knives 166 project over the teeth 169 as shown, and their projecting edges 167 may be ground to re-sharpen them without changing their outside diameter.

End flanges 164 are provided for the bolts 108. The use of multiple knife holders, as above described, permits the cutting of sections down to ½" in length or less.

It is obvious that if knife holders of the type of 162 are used to cut sections of say 6 7/16", the adjacent knives of successive holders may also be spaced at 6 7/16", to cut only this length with all the knives in use. Such multiple knife holders give wide latitude in the design and operation of the shearing apparatus herein described.

Reverting to certain parts not previously mentioned, each housing 2 and 3 has a cap 11, secured by bolts 12. A cover or guard plate 13 rests on the tops of the bolts 12, to protect the parts beneath, and is secured by cap screws 86.

Figure 2:
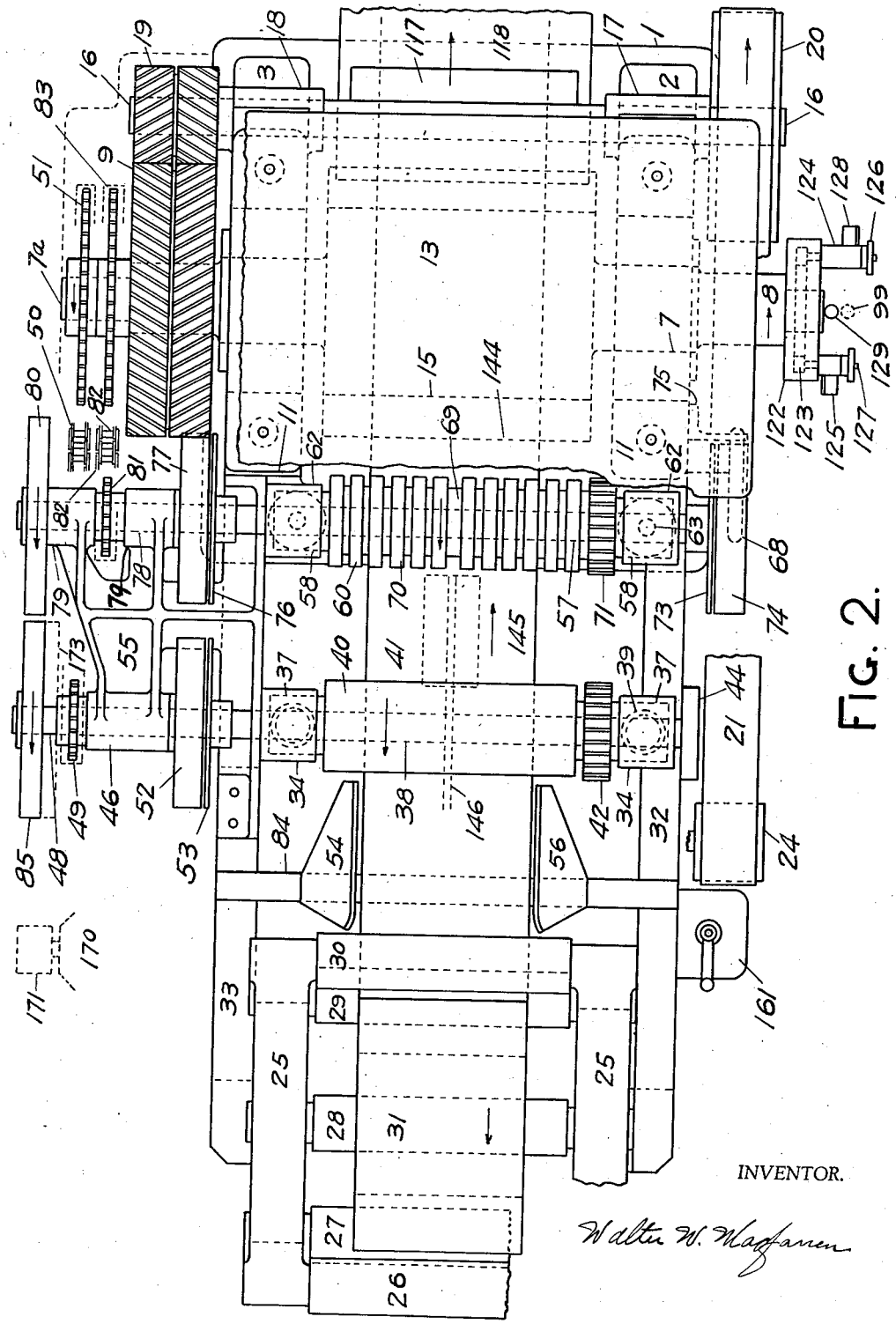
Fig. 2 is a plan view of the same with the motors omitted.

Guides 54 and 56 are provided for the strip 41, which rest on a cross member 84. A small fly wheel 85 is provided for the coil feed rolls 40, and mounted on the shaft 48. A box or cover 87 encloses the mechanical switch 130, and is secured to the housing 2. Bolts 89 secure the housings 2 and 3 to the bedplate 1. The outer position of the ball member 129 is indicated at 99 in dotted lines in Fig. 2. Separator bolts 111 connects the standards 25. The dotted lines at 144 in Fig. 2 represent the outer (pitch diameter) of the knives 100. A controller for the motor 22 is shown at 161.

Figure 7:
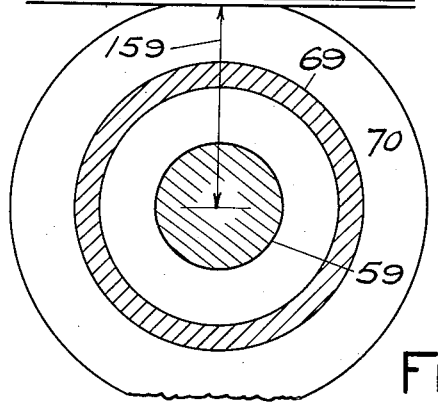
Fig. 7 is an enlarged cross section of the strip feed rolls, showing their elastic adjustment etc.

Referring now to Fig. 7, each of the strip feed rolls 60 is composed of a body portion 69 and an elastic sheath or cover 70. The cover 70 may be formed as a continuous sheath from end to end of the roll 70, or preferably of a number of spaced rings about 1" wide and ¼" apart.

The purpose of this elastic cover is not to obtain a firm grip on the strip 41, which grip may be ample with all metal rolls, but to provide an elastically adjustable radius for the roll, by which, in effect, the circumference and thereby the delivery of the roll may be changed while running.

In my co-pending application Ser. No. 73,790, I have shown means for producing this effect with all metal feed rolls, but for the slight amount of change needed in the present design I prefer the construction herein shown, which is less expensive.

This variation is desirable for two purposes as follows: 1st, to provide a fine adjustment for the delivery of the strip feed rolls 60 to compensate for slippage or other inaccuracies. 2nd, to provide a limited amount of asynchronism between the circumferential speed of the knives 100 and the lineal speed of the strip 41, which is adjustable while the machine is running, to slightly vary the lengths of the cut sections.

In Fig. 7 I have indicated how this may be done. If the pitch circumference of the knife edges is 60", as previously assumed, the diameter will be approximately 19⅛", and the circumference of a non-elastic roll 60 to give a synchronous speed of the strip 41 with the knives 100 would be 40", and its diameter about 6⅜", if the drum 15 and the rolls 60 were driven at a speed ratio of three to one.

Assuming for the moment that the desired normal radius of the rolls 60 for synchronous operation, is 3 3/16" or 3.188", if the actual outside radius 158 of the rubber sheath 70 is made 3.250", and the rolls 60 are forced into contact with the strip 41 until they are flattened as shown in Fig. 7, the distance 159 from the center of the roll to the flat, or the strip, will represent roughly the effective working radius for the delivery of the rolls 60, and if this distance is fixed by the adjustment of the roll centers at 3.188", approximately synchronous conditions will exist.

I say "approximately synchronous conditions" because the creeping effect of the rubber sheath 70 may vary them slightly. However, this can be overcome by further adjustment, in one direction or the other, so we can assume that the radius 159 represents synchronous conditions.

On this assumption an increase of the radius 159 would cause a greater length of the strip 41 to be delivered from the rolls 60, and sections of increased length to be cut, while a decrease of the radius 159 would cause a lesser length of strip to be delivered from the rolls 60 to the knives 100, and sections of shorter lengths to be cut therefrom.

This construction, therefore, provides a fine operating adjustment under the control of the hand wheel 68. In amount, this change of length for the cut sections would be roughly 6/1000" for each change of 1/1000" in the radius 159, per revolution of the rolls 60. A radial adjustment of approximately 1/24" would change the lengths of the cut sections by ¼" per revolution of the rolls 60, and as this adjustment can be plus or minus, the operator could probably obtain a substantial change in the cut section lengths without any knife adjustment whatever.

The spaces between the rubber rings on rolls 60 provide room for the displaced rubber, the principle being the same as that used for dual solid rubber tires on trucks.

In Fig. 1, I have indicated diagrammatically a sheet or strip leveller 160, the desirability of which will depend on the conditions of operation. If the strip 41 has been coiled hot, a leveller may be desired. If the strip 41 has been cold rolled before coiling, a leveller may not be necessary. In any case, a leveller is a distinct machine, and forms no part of my invention.

In case however that a leveller is used, it could displace the coil feed rolls 40, and could have its driving motor stopped and started by the operation of the contacts 150 and 151, the same being actuated by the extension and shrinkage of the loop 145 as previously described.

Having now described in detail the construction of my improved rotary shearing apparatus, I call attention to several conditions under which it may be operated, with my estimate of the respective proper operating speeds.

There are at least six sets of operating conditions as follows:

1. Shearing direct from a cold rolling mill at bar speeds of 200 feet per minute to 300 feet per minute, or more.
2. Shearing heavy long bars from a hot bed at 100 to 300 F. P. M.
3. Shearing heavy strip from a coil with a "gap" at speeds of 200 to 400 F. P. M.
4. Shearing light strip from a coil with a "gap" at speeds of 200 to 1000 F. P. M.
5. Shearing light strip from a coil with evenly spaced knives and no "gap," at speeds of 1000 to 2000 feet per minute.
6. Shearing light strip from a coil, with uneven knife spaces and a small "gap," using a continuous feed for the strip, and scrapping the short sections cut at the gap, at speeds of 1000 to 2000 feet per minute, or more.

I will first describe the operation when cutting from coils as follows: The knives 100 being in place and properly spaced to make the desired cuts, the coil 31 is placed in the roller cradle supported by the standards 25, and the end of the strip 41 is led between the coil feed rolls 40, bent to form the loop 145, and then led between the strip feed rolls 60.

This can all be done by power if the controller for the motor 22 has a special slow speed notch for this purpose. It will be noted that with a pitch circumference of 60" for the knife cutting edges 102, there are certain lengths of sections which can be cut with equally spaced knives, as follows:

Cut length____4" 5" 6" 7½" 10" 12" 15" 20" 30" 60"
No. of knives__15 12 10 8    6   5   4   3   2   1

Also 8.571" with 7 knives, and 6.667" with 9 knives.

If such even (knife spacing) sections are to be cut, the shifters 124 may be removed from the face plate 122, as they will not be needed. The hand wheel 68 may be adjusted by marks on its periphery to the operator's best guess at the adjustment desired, and a section cut off at a slow trial speed for gauging.

This may be repeated a time or two until the correct section length is cut, when the motor 22 can be accelerated to full speed, say to give a strip speed of 1000 feet per minute.

When sections are to be cut requiring uneven spacing of the knives 100 and with a "gap," the strip 41 is placed in position as before, and led through the strip feed rolls 60 with its front end at a position such as shown at 86 in Fig. 8, when the leading knife A of the cutting group is in the position shown.

The shifters 124 are then positioned, one to throw in the magnetic clutch 77, in time to advance the front end of the strip 41 a little beyond the cutting position at F, when the knife A reaches this position, and the other to apply the brake magnet 74 to stop the feed of the strip immediately after the knife F has made its cut.

It will be noted that as the strip may be light, the rolls 60 are light and are rotating at a moderate speed, and the brake 74 may be made as powerful as desired, the forward end of the strip may be stopped with a slight projection, say ⅛", beyond the cutting position.

As the knife A comes around to the cutting position, the leading end of the strip is quickly started by the strip feed rolls 60 under control of the magnetic clutch 77, which may also be very quick in action, and the cutting cycle is repeated.

The starting action may take another ⅛" of strip, that is, the strip end will have advanced ⅛" more before the knives A cut, which insures an accurate start for the cutting cycle and wastes ¼" of material, each time the "gap" makes a revolution. In percentage this is less than ½%, and is the price of mechanical convenience, and the ability to cut any lengths of sections from 1" to 60" by very small variations.

The length of the loop 145 is automatically controlled, as before indicated, and the cutting cycles follow one another at the speed set by the operator with the variable speed motor 22 until the entire coil is cut into desired length sections.

It will be noted that after reaching the desired operating speed, the drums 14 and 15, the clutch members 52 and 77, and the flywheels 20, 80, and 85, may rotate continuously at a constant speed (as constant as a commercial electric motor will provide) which is conducive to smooth running, and whose operating value rises sharply as speeds are increased; indeed, making possible speeds which are out of the question with other types of mechanism, as for instance, the Biggert patent previously cited.

It will be noted that when cutting from a coil, the coil feed rolls 40 must be able to supply as much length of strip as the cutting knives demand, plus say five per cent for asynchronous operation, and plus a further five percent for safety, or to insure that there will always be a sufficiency.

The maximum demand occurs when evenly spaced knives are used as for 10", 15", 20", or 30" sections. When a "gap" is used, the amount not demanded by the "gap" is compensated for by the more frequent stoppage of the coil feed rolls 40.

When shearing long heavy bars from a hot bed, it is necessary in feeding the bar to the knives, to accelerate and decelerate its whole length and weight, when shearing with a "gap," which obviously will reduce the speed of the operation.

In this case also, an excessive duty will be placed on the strip feed rolls 60, so that under these conditions I propose to use both the feed rolls 40 and the feed rolls 60, to advance the bar to the knives, the loop 145 being omitted.

To do this it is merely necessary to connect the two magnetic clutches 52 and 77 in parallel (electrically), and operate both of them by the mechanical switch 130. This may be done by simply changing the wiring or by an appropriate extra circuit.

When shearing material issuing from the finishing rolls of a cold rolling mill (or any other mill), it is necessary to make use of some auxiliary mechanism as follows:

In Figs. 1 and 2, I have indicated in dotted lines an auxiliary motor 170, which may be mounted on the platform 23, and provided with a pulley 171, which in turn may drive a belt 172, which engages a rim 173 on the fly wheel 85, to drive the coil feed clutch 52.

The motor 170 may be a variable speed motor of usual design, with appropriate controls, and a speed range sufficient to cover the speed variations of the mill.

By applying the belt 172 to the pulleys 171 and 173, and wiring around the contacts 150 and 151, to establish a steady current supply to the magnetic clutch 52, and also removing the drive chain 50 from its sprockets, the feed rolls 40 are placed under the control of the motor 170.

Now by adjusting the speed of the motor 170 to drive the rolls 40 so they will run a little faster than the strip 41 and slip on it, or by cutting down the current supply to the magnetic clutch 52 (by resistance) to allow it to slip, the rolls 40 will receive and pass on the strip 41 as fast as the mill supplies it.

With these adjustments made, the operator, at the slow speed set by the cold rolling mill, can easily control the speed of the variable speed motor 22 by manual manipulation of its controller, to control the loop 145; or the motor 22 can be controlled automatically by the loop 145 in the same manner as previously described for the clutch 52, by the use of appropriate electrical connections.

It will be noted that while this method of operation is somewhat different from the previously described method of shearing from coils, it is merely a difference in method, and uses the same main members of the apparatus in different relations and with different functions. The shear may be set behind a cold rolling mill in tandem relation to a coiler, and to the mill, and either the shear may be used to shear direct from the mill as above described, or the shear may remain idle, and the strip coming from the mill may be coiled.

While I have described the control of the loop 145 as being obtained by periodic stoppages of the coil feed rolls 40, it will be obvious that the same result could be obtained by slowing down the rolls 40 instead of stopping them completely. The essential thing is the automatic control of the loop.

When shearing short sections with a continuous feed, as with evenly spaced knives, or with a small "gap," and at a strip speed of even 500 feet per minute, the number of sections cut is large. The following figures give an idea of the machine's capacity:

|  | Capacity per hour |
|---|---|
| Section length 2" | 180,000 |
| Section length 3" | 120,000 |
| Section length 4" | 90,000 |
| Section length 5" | 75,000 |
| Section length 6" | 60,000 |

The arrangement and details of my improved rotary shearing apparatus may be varied by those skilled in the art to suit the specific conditions of operation without departing from the scope of the following claims.

I claim as my invention:

1. In rotary shearing apparatus for transversely subdividing metal bars or strips into desired length sections, a pair of parallel rotary knife carrying drums mounted on fixed centers and geared together, the said drums having cylindrical exterior surfaces which are provided with evenly spaced flutes or teeth, a knife holder on each of the said drums, the said knife holder having corresponding teeth to fit the spaces between the drum teeth, coacting shear knives secured to the said knife holders, and means for clamping each knife holder to its drum, whereby the knife holders are rigidly secured to the drums, and may be adjusted circumferentially around the drums, from tooth to tooth.

2. In rotary shearing apparatus for transversely subdividing metal bars or strips into desired length sections, a pair of rotary knife carrying drums mounted on fixed centers and geared together, a plurality of knife holders secured to each of the said drums and so spaced around the drums that there will be a number of spaces of even length and one space of a different length, coacting shear knives secured to the several knife holders, and means for operating the machine to cut sections from the bar corresponding to the even knife spaces.

3. In rotary shearing apparatus for transversely subdividing metal bars or strips into desired length sections, a pair of parallel rotary knife carrying drums mounted on fixed centers and geared together, a shear knife secured to each of the said drums, primary feeding means operatable either continuously or intermittently as desired, for feeding the bar between the knives when cuts are to be made, and secondary feeding means operating intermittently, to supply the material to the said primary feeding means, as required to make the desired cuts.

4. In rotary shearing apparatus for transversely subdividing metal bars or strips into desired length sections, a pair of parallel rotary knife carrying drums mounted on fixed centers and geared together, a shear knife secured to each of the said drums, primary feeding means for feeding the bar between the knives when cuts are to be made, secondary feeding means for supplying material to the said primary feeding means as needed, means for forming a loop in the bar between the primary and the secondary feeding means, and means actuated by the changing length of the said loop for controlling the feeding action of the said secondary feeding means, whereby the said loop is automatically maintained.

5. In rotary shearing apparatus for transversely subdividing metal bars or strips into desired length sections, a pair of parallel rotary knife carrying drums mounted on fixed centers and geared together, and operating at substantially uniform speeds when cuts are being made, a shear knife rigidly secured to each of the said drums, the said two knives coacting to shear the bar, a pair of feed rolls for feeding the bar between the knives to be cut, and means for operating the said feed rolls intermittently.

6. In rotary shearing apparatus for transversely subdividing metal bars or strips into desired length sections, a pair of parallel rotary knife carrying drums mounted on fixed centers and geared together, a group of shear knives on each of the said drums, spaced evenly with respect to each other but unevenly with relation to the drum periphery, the two groups of knives coacting with each other to shear the bar into desired sections, feeding means for feeding the bar at a substantially uniform speed to the groups of coacting knives, and means for stopping the said feeding means during that interval of rotation of the drums during which the last pair of knives and the first pair of knives are brought into contact.

7. In rotary shearing apparatus for transversely subdividing metal bars or strips into desired length sections, a pair of parallel rotary knife carrying drums mounted on fixed centers and geared together, a shear knife on each of the said drums coacting with a similar knife on the other drum, primary feed rolls to advance the end of the bar to the knives, secondary feed rolls to maintain a loop in the bar between the said two pairs of feed rolls, a magnetic clutch controlling the feeding action of the said secondary feed rolls, and a mechanically actuated switch operated by the lower end of the said loop for controlling the current supply to the said magnetic clutch.

8. In rotary shearing apparatus for transversely subdividing metal bars or strips into desired length sections, a pair of parallel rotary knife carrying drums mounted on fixed centers and geared together, a pair of feed rolls for advancing the end of the bar between the knives, means for moving one of the said feed rolls toward or away from the other, the said feed rolls each having a rigid body portion and an elastic cover or sheath, and means for driving the said feed rolls in a fixed ratio to the speed of the knife drums, whereby when the said feed rolls are moved together or apart, their effective circumference is altered and the bar being cut is fed slower or faster with respect to the rotary speed of the knives, thus changing the lengths of the cut sections.

9. In rotary shearing apparatus for transversely subdividing metal bars or strips into desired length sections, a pair of parallel integral rotary knife carrying drums mounted on fixed centers and geared together, a knife holder rigidly attached to each of the said drums, and a plurality of knives secured to each of the said knife holders and spaced apart to cut desired length sections, the knives on one of the said holders coacting with the knives on the other of the said holders and all of said knives having cutting edges parallel to each other.

10. The combination of a rolling mill with shearing apparatus comprising a pair of parallel knife carrying drums mounted on fixed center and geared together, and arranged to make transverse cuts on a moving metal bar coming out of the mill rolls, to subdivide the same into desired length sections, knives secured to the said drums in coacting relation to each other, primary feeding means for advancing the end of the bar between the knives to make the cuts, secondary feeding means to receive the bar from the mill and pass it on to the said primary feeding means, the said secondary feeding means being arranged to take the bar as fast as it comes from the mill and to deliver it through a loop to the said primary feeding means, a motor to drive the drums and the said primary feeding means, a second motor to drive the said secondary feeding means, and means for controlling the speed of the said first motor to maintain a substantially uniform loop in the bar, whereby the speed of the drums will be roughly accommodated to the speed of the bar advancing from the mill rolls, and the bar will be cut into sections of the desired lengths.

11. The combination of a rolling mill with shearing apparatus comprising a pair of parallel rotary knife carrying drums mounted on fixed centers and geared together, and arranged to make transverse cuts on a moving metal bar coming out of the mill rolls to subdivide the same into desired section lengths, knives secured to the said drums in coacting relation to each other, primary feeding means for advancing the end of the bar between the knives to make the cuts, secondary feeding means to receive the bar from the mill and pass it along to the said primary feeding means, means for driving the said secondary feeding means at a speed slightly above the speed of the oncoming bar so as to take it away as fast as the mill delivers it, means for forming a loop in the bar between the said primary and the said secondary feeding means, driving connections between the said primary feeding means and one of the knife carrying drums, to drive the former, a motor for driving the drums, and means for controlling the speed of the said motor to maintain the said loop in condition to permit the passage of an ample supply of material to the said primary feeding means.

12. In rotary shearing apparatus for transversely subdividing metal bars or strips into desired length sections, a pair of parallel rotary knife carrying drums mounted on fixed centers and geared together, the said drums having cylindrical surfaces which are provided with evenly spaced flutes or teeth, a knife holder on each of the said drums, the said knife holder having corresponding teeth to fit the spaces between the drum teeth, said teeth spacing the knife holders in steps, by means of the coacting teeth, and liners between the knives and their holders for varying the said spacing.

13. In rotary shearing apparatus for transversely subdividing metal bars or strips into desired length sections, a pair of parallel rotary knife carrying drums mounted on fixed centers and geared together, means for delivering the cut sections off the lower drum including a substantially smooth surface on the said drum, a guide plate or stripper, and a carrying conveyor to remove the cut sections.

14. In rotary shearing apparatus for transversely subdividing metal bars or strips into desired length sections, a pair of parallel rotary knife carrying drums mounted on fixed centers and geared together, a shear knife secured to each of the said drums, a pair of cut controlling feed rolls operating either continuously or intermittently when cuts are to be made, for feeding the end of the bar between the knives, and a second pair of feed rolls for automatically maintaining a loop in the bar, from which the cut controlling feed rolls may draw material as needed to produce the desired cut sections.

15. In rotary shearing apparatus for transversely subdividing metal bars or strips into desired length sections, a pair of parallel rotary knife carrying drums mounted on fixed centers and geared together, a shear knife secured to each of the said drums, a pair of cut controlling feed rolls operating either continuously or intermittently when cuts are to be made, for feeding the end of the bar between the knives, and a second pair of feed rolls for feeding the bar to the said cut controlling rolls, and means for operating the said second set of feed rolls continuously.

16. In rotary shearing apparatus for transversely subdividing metal bars or strips into desired length sections, a pair of parallel rotary knife carrying drums mounted on fixed centers and geared together, a group of shear knives spaced evenly around each of the said drums and rigidly secured thereto, the knives of one group coacting into sections shorter than the periphery of said drums respectively with the knives of the other group to shear the bar, means for feeding the bar between the knives to be cut, and means for operating the said feeding means in asynchronous relation to the speed of the knives, to shorten or lengthen the sections cut by the said knives.

17. In rotary shearing apparatus for transversely subdividing metal bars or strips into desired length sections, a pair of parallel rotary knife carrying drums mounted on fixed centers and geared together, shear knives spaced unevenly around each of the said drums, each of the said knives coacting with an opposed knife to shear the bar, intermittently operating feeding means for the bar, and means for operating the said feeding means asynchronously to the speed of the knives, to shorten or lengthen the sections cut from the bar.

18. In rotary shearing apparatus for transversely subdividing metal bears or strips into desired length sections, a pair of integral parallel rotary knife carrying drums mounted on fixed centers and geared together, a knife holder secured to each of the said drums, means for securing the said knife holder radially to the said drum, independent means for holding the said knife holder in a desired circumferential position on the said drum when secured by said securing means, and a shear knife secured to each of the said knife holders, the said knives coacting with each other to shear a bar passing between the said drums.

19. In rotary shearing apparatus for transversely subdividing metal bars or strips into desired length sections, a pair of integral parallel rotary knife carrying drums mounted on fixed centers and geared together, a knife holder secured to each of the said drums, means for securing the said knife holder radially to the said drum, independent means for holding the said knife holder in a desired circumferential position on the said drum when secured by said securing means, and a plurality of knives secured to each of the said knife holders and spaced apart to cut desired length sections from the stock, the knives on one drum coacting with the knives on the other drum to shear the bar.

20. In rotary shearing apparatus for transversely subdividing metal bars or strips into desired length sections, a pair of parallel rotary knife carrying drums mounted on fixed centers and geared together, a plurality of knife holders secured to each of the said drums, coacting shear knives secured to each of the said knife holders, curved covers located radially near the cutting edges of the knives and extending from end to end of the lower drum, and between the said knife holders, and means for securing the said covers to the said lower drum 21. In rotary shearing apparatus for transversely subdividing metal bars or strips into desired length sections, a pair of parallel rotary knife carrying drums mounted on fixed centers and geared together, a pair of flat rings secured to the ends of the lower drum in opposed relation, sectional covers extending from ring to ring, and a groove at one side of each of the said ring and near its outer edge, to position the said sectional covers.

22. In rotary shearing apparatus for transversely subdividing metal bars or strips into desired length sections, a pair of parallel rotary knife carrying drums mounted on fixed centers and geared together, a cradle or support for a coil of strip metal, feed rolls to withdraw material from the said coil, feed rolls to feed the end of the strip between the rotating knives, a clutch controlling the operation of the said withdrawing feed rolls, a loop in the strip between the said two pairs of feed rolls, and means operated by the changing length of the said loop for controlling the said clutch.

23. In rotary shearing apparatus for transversely subdividing metal bars or strips into desired length sections, a pair of parallel rotary knife carrying members mounted on fixed centers and geared together, primary feeding means for feeding the bar to the knives including a clutch and a brake, secondary feeding means for feeding the bar to said primary feeding means also including a clutch and a brake, and coacting shear knives on the said knife carrying members, for cutting desired length sections from the bar.

24. In rotary shearing apparatus for transversely subdividing metal bars or strips into desired length sections, a pair of parallel rotary knife carrying members mounted on fixed centers and geared together, coacting shear knives on the said carrying members to shear the bar, primary feeding means for feeding the bar to the knives including an automatic clutch, and secondary feeding means for feeding the bar to said primary feeding means and also including an automatic clutch.

25. In rotary shearing apparatus for transversely subdividing metal bars or strips into desired length sections, a pair of parallel rotary knife carrying drums mounted on fixed centers and geared together, a faceplate secured to the shaft or trunnion of one of the said drums, a pair of adjustable projections secured to the said faceplate, feed rolls for advancing the bar between the knives, a magnetic clutch for starting and driving the said feed rolls, a magnetic brake for stopping the said feed rolls, and an electric switch mechanically operated by the said faceplate projections for controlling the operation of the said feed rolls.

26. In rotary shearing apparatus for transversely subdividing metal bars or strips into desired length sections, a pair of parallel rotary knife carrying drums mounted on fixed centers and geared together, a faceplate secured to each of the said drums, a pair of adjustable projections secured to each of the said faceplates, feed rolls for advancing the bar between the knives, a magnetic clutch for starting and driving the said feed rolls, a magnetic brake for stopping the same, and two electric switches, one of each being operated by the projections on one of the said faceplates, the said switches being connected in parallel with the said clutch and the said brake, to control their operations, whereby the said feed rolls may be started and stopped twice in one revolution of the said drums.

27. In rotary shearing apparatus for transversely subdividing metal bars or strips into desired length sections, a pair of parallel rotary knife carrying drums mounted on fixed centers and geared together, a pair of feed rolls for advancing the bar to the knives to be sheared, the said feed rolls each having a rigid body portion and an exterior bar contacting portion comprising a series of spaced rubber rings, means for driving the said feed rolls in a fixed ratio to the circumferential speed of the knives, and means for adjusting the said feed rolls toward or away from each other to change the length of the sections being sheared from the bar.

28. In rotary shearing apparatus for transversely subdividing metal bars or strips into desired length sections, a pair of parallel rotary knife carrying drums mounted on fixed centers and geared together, knife holders secured to the exterior of the drums in spaced relation to each other, to divide each drum into even spaces, means to operate the knives for cutting sections of the length of the knife spacing with all the said knives in use, and means to operate the knives for cutting sections of the same length as before with several of the said knives removed.

29. In rotary shearing apparatus for transversely subdividing metal bars or strips into desired length sections, a pair of parallel rotary knife carrying drums mounted on fixed centers and geared together, a knife holder on each of said drums, a shear knife on each of said knife holders, said knives coacting with each other to shear the bar, means for clamping each of said knife holders radially to its drum, and separate interlocking means for preventing circumferential displacement of said knife holder relative to said drum.

30. In rotary shearing apparatus, the combination of a pair of rotary knife carrying drums, shear knives on the said drums, circumferentially adjustable with respect thereto, and an intermittently operatable device for feeding the stock to be sheared between the knives.

31. In rotary shearing apparatus for transversely subdividing metal bars or strips into desired length sections, a pair of parallel rotary knife carrying drums mounted on fixed centers and geared together, a feed roll for advancing the end of the bar between the rotating knives, a shaft in line with the said feed roll and driven from one of said drum shafts, a flywheel on the said shaft, and a clutch connecting said shaft to said feed roll to drive the latter.

32. In rotary shearing apparatus for transversely subdividing metal bars or strips into desired length sections, a pair of parallel rotary knife carrying drums mounted on fixed centers and geared together, a plurality of knife holders secured to each of said drums to divide the drum periphery into a number of even spaces and one odd space, either greater or less than the said even spaces, and means for cutting sections of the even space length only, and independent of the said odd space length.

33. In rotary shearing apparatus for transversely subdividing metal bars or strips into desired length sections, a pair of parallel rotary knife carrying drums mounted on fixed centers and geared together, a plurality of knife holders secured to each of said drums to divide the drum periphery into a number of even spaces and one odd space, the said even spaces being for the purpose of cutting desired section lengths, and the said odd space being of considerably less length than the said section length, means for cutting the said section lengths only at one speed and without appreciable waste of material, and means for cutting both the said section lengths and the odd space length at the same time and at a much higher speed.

34. In rotary shearing apparatus for transversely subdividing metal bars or strips into desired length sections, a pair of parallel rotary knife carrying drums mounted on fixed centers and geared together, a plurality of knife holders secured to each of said drums, coacting shear knives carried thereby, means for setting the knife holders to divide the drum periphery into even spaces, means for feeding the bar to the knives to be cut at high speed under these conditions, means for setting the knife holders to divide the drum periphery into a number of even spaces and one odd space longer than said even spaces, and means for feeding the bar to the knives at a lower speed, and cutting sections of the even space length, while stopping the feed during the passage of the said odd space.

35. The combination with a rolling mill, of shearing apparatus comprising a pair of parallel rotary knife carrying drums mounted on fixed centers and geared together, and provided with rigidly attached coacting shear knive, means for engaging the leading end of a bar coming out of the mill rolls, and means for manipulating the same to the end that desired length sections may be cut from the bar of accurate lengths, and irrespective of changes of speed of the mill under usual operating conditions thereof.

36. The combination of a rolling mill with shearing apparatus comprising a pair of rotary knife carrying drums mounted on fixed centers and geared together, and arranged to make transverse cuts on a moving metal bar coming out of the mill rolls to subdivide the same into desired length sections, shear knives secured to the said drums in coacting relation to each other, primary feeding means for advancing the end of the bar between the knives to make the cuts, secondary feeding means to receive the bar from the mill and pass it on to said primary feeding means, said secondary feeding means being arranged to take the bar as fast as it comes from the mill, and deliver it through a loop to said primary feeding means, a motor to drive the drums and the primary feeding means, a second motor for driving said secondary feeding means, and means for controlling the speed of said first motor to maintain said loop of substantially uniform size, whereby the speed of said drums will be roughly accommodated to the speed of the bar advancing from the mill rolls, and said bar cut into sections of desired length.

37. In rotary shearing apparatus for transversely subdividing metal bars or strips into desired length sections, a pair of parallel rotary knife carrying drums mounted on fixed centers and geared together, coacting shear knives on the said drums, and two pairs of clutch controlled feed rolls for advancing the bar, said feed rolls being normally independently operated when cutting from coiled stock, but which may be synchronized for simultaneous operation on straight bars.

38. In rotary shearing apparatus for transversely subdividing metal bars or strips into desired length sections, a pair of parallel rotary knife carrying drums mounted on fixed centers and geared together, a plurality of knife holders secured to each of said drums, and so spaced around the drums that there will be a number of spaces of even length and one space of a different length, a second number of even spaces of a different length from the said first mentioned spaces, and one odd space of an indeterminate length, coacting shear knives on the several knife holders, means for operating the machine to cut sections from the bar corresponding in length to the knife spacings of the two groups of evenly spaced knives.

WALTER W. MACFARREN.